United States Patent [19]

Housley

[11] Patent Number: 5,128,210

[45] Date of Patent: Jul. 7, 1992

[54] METHOD FOR PREPARING AND COOKING POTATOES

[76] Inventor: Grady E. Housley, 1051 Housley Rd., Marietta, Ga. 30066

[21] Appl. No.: 415,635

[22] Filed: Oct. 2, 1989

[51] Int. Cl.⁵ ............................................ A23L 1/216
[52] U.S. Cl. ................................. 426/438; 426/481; 426/637
[58] Field of Search ............... 426/637, 438, 481, 512, 426/514, 518, 523, 808

[56] References Cited

U.S. PATENT DOCUMENTS

| | | | |
|---|---|---|---|
| 1,485,253 | 2/1924 | Devlin | 426/518 |
| 1,968,254 | 7/1934 | Janak | 426/281 |
| 3,687,688 | 8/1972 | Stapley et al. | 426/637 X |
| 3,707,384 | 12/1972 | Filz | 426/281 |
| 4,221,822 | 9/1980 | Horn et al. | 426/438 |
| 4,387,111 | 6/1983 | Mullender | 426/637 X |

Primary Examiner—Arthur L. Corbin
Attorney, Agent, or Firm—Kennedy & Kennedy

[57] ABSTRACT

A set of holes are bored into a potato in preparation for cooking to provide a multi-holed potato and potato twirls. Apparatus for forming the multi-holed potato has a gang of parallel drills mounted for rotary and reciprocal movement through holes in a pair of plates spaced apart a distance to support the potato therebetween.

7 Claims, 2 Drawing Sheets

METHOD FOR PREPARING AND COOKING POTATOES

TECHNICAL FIELD

This invention relates to methods and apparatuses for preparing and cooking potatoes for consumption.

BACKGROUND OF THE INVENTION

Potatoes are traditionally cooked for eating by being baked, boiled, broiled or fried. In "fast food" type restaurants potatoes are usually fried and served in the form of "french fries". As is well known, french fries are potatoes which have been sliced into elongated strips of generally rectangular cross section and deep fried. The primary reason that potatoes are served in the form of french fries at such restaurants is their ease of being eaten by hand feeding. This is because once cooked french fries have a fairly dry, crusty exterior and a size such as to render them to be easily eaten as finger foods accompanying finger food burgers which are commonly consumed at such fast food restaurants.

For many years restaurants have served potatoes almost exclusively in the form of french fries. It has been thought that other forms of cooked potatoes would be inappropriate to prepare and serve in that type of establishment since they would not be suitable for consumption as finger foods. For example, shapes of fries other than the common square strip shape have not been considered appropriate for reasons that include the fact that very small shapes, such as hash browns or nuggets, may not be readily dipped into a sauce, usually catsup or the like, without the patron's fingers contacting the sauce too. Conversely, large sizes such as whole potatoes would have an excessive amount of the relatively soft potato core with respect to an insufficient amount of crust in bites to be appetizing. Thus, for many years now potatoes have normally been served here only in the form of the conventional french fry.

Accordingly, it is seen that were a novel way of preparing and cooking potatoes for consumption as finger foods of new and distinctive sizes and shapes and yet with the taste and texture of traditional french fries preserved, a distinct advance in the art would be achieved. It is to the provision of such therefore that the present invention is primarily directed.

SUMMARY OF THE INVENTION

It has now been discovered that by drilling a set of holes through potatoes, they may be cooked, preferably by deep frying, to form a finger food of excellent texture and taste. In a preferred form of the invention a potato is prepared for eating by placing it upon a support having an array of channels extending to the top surface thereof, advancing a set of rotating drills downwardly through the potato and into the support channels thereby forming a set of holes extending completely through the potato. The set of drills is retracted from the support channels and the potato, and the potato is then removed from the support and cooked.

DETAILED DESCRIPTION

Figure 1:
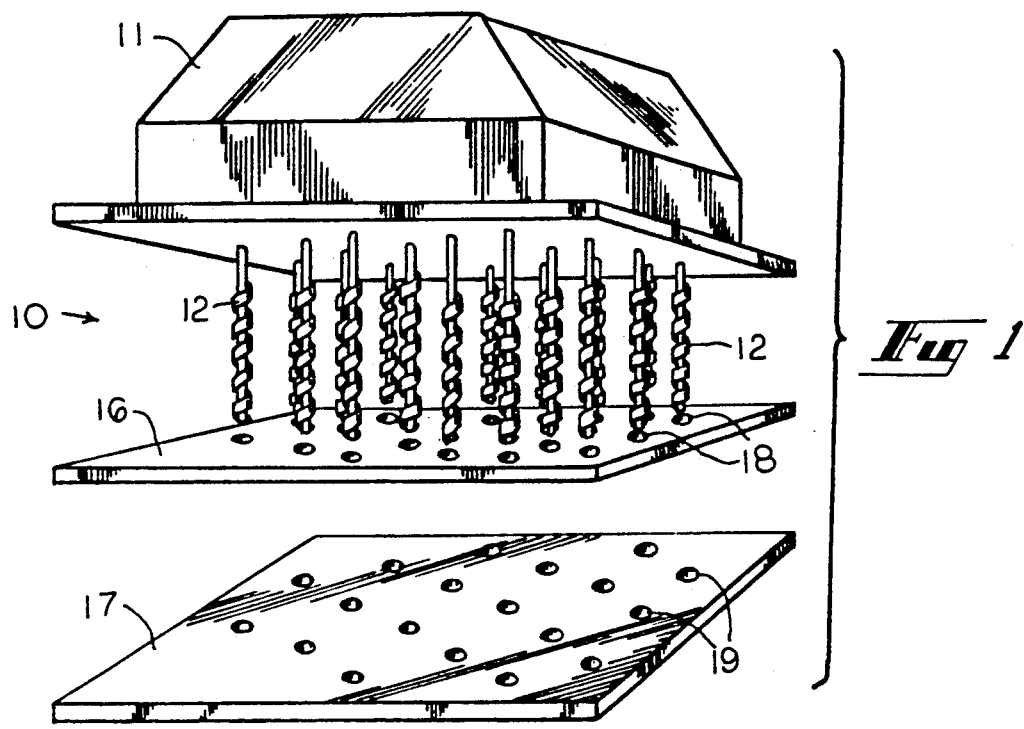
FIG. 1 is an exploded view, in perspective, of apparatus embodying principles of the present invention which may be used in practicing methods of the invention.
Figure 5:
FIG. 5 is an enlarged side elevation view of one of the drills shown in FIG. 1.

With reference now to FIG. 1, there is shown apparatus 10 for use in preparing potatoes for cooking which comprises a drill head or housing 11 which contains a conventional electric motor. A gang of parallel drills 12 depend downwardly from the housing which are driven by the motor through gearing that is also mounted within the housing 11. Preferably, the drills are half inch in diameter and spaced apart approximately one half inch. Each of the fluted or working portions of the drills is approximately 4 inches in length with a 5/16 inch land width. The drill web here is preferably ⅛ inch in diameter. The web is indicated at 13 in FIG. 5 while the helical land is indicated at 14.

Figure 4A:
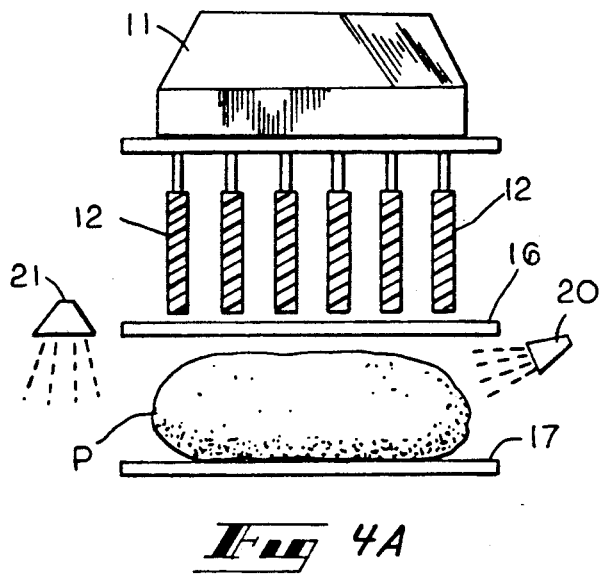
FIGS. 4A-4D are four diagrammatical views that illustrate an operative sequence in utilizing the apparatus of FIG. 1 in processing a potato for cooking.

The apparatus further includes an upper plate 16 and a lower support plate 17 which are mounted adjacent the drills spaced apart a distance to accommodate a potato P therebetween. The upper plate 16 has an array of channels 18 through which the drills 12 may pass with clearance upon movement of the housing 11 by unshown drive means. The lower plate 17 also has an array of channels 19 to accommodate at least the tips of the drills. A side water spray nozzle 20 is mounted to one side of the upper and lower plates while a vertical water spray nozzle 21 is mounted to the opposite side, as shown only in FIG. 4A.

Figure 2:
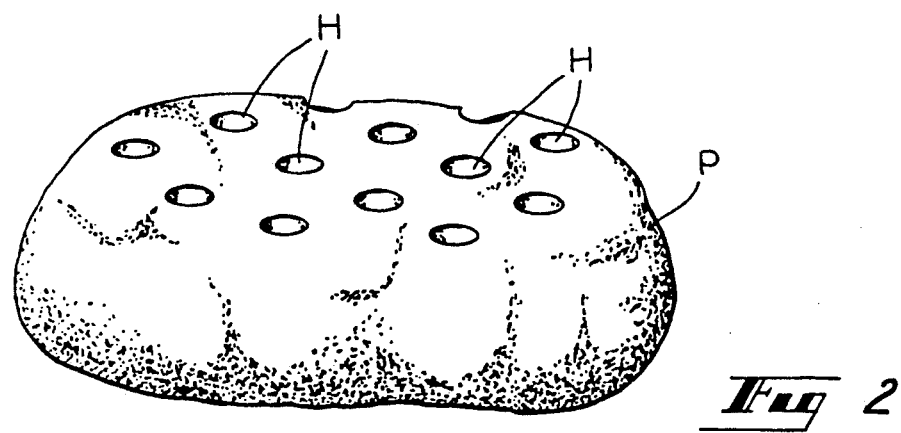
FIG. 2 is a perspective view of a potato after being processed with the apparatus illustrated in FIG. 1.
Figure 3:
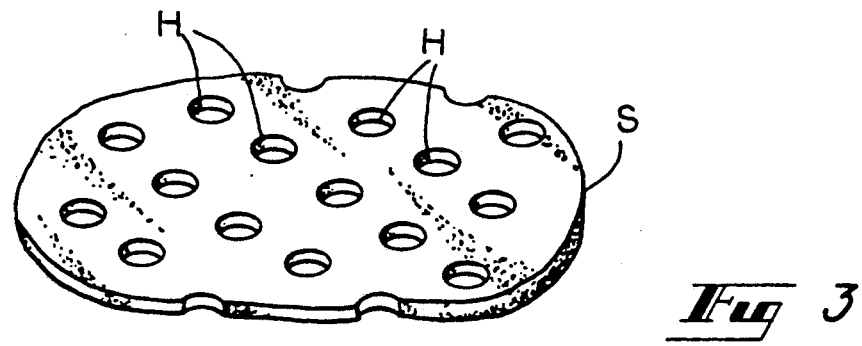
FIG. 3 is a perspective view of a slice of the potato illustrated in FIG. 2.
Figure 4B:
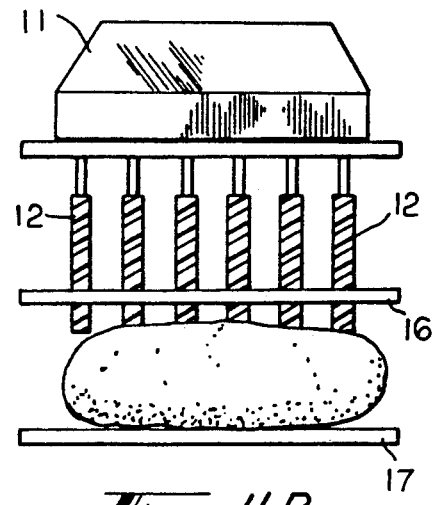
Figure 4C:
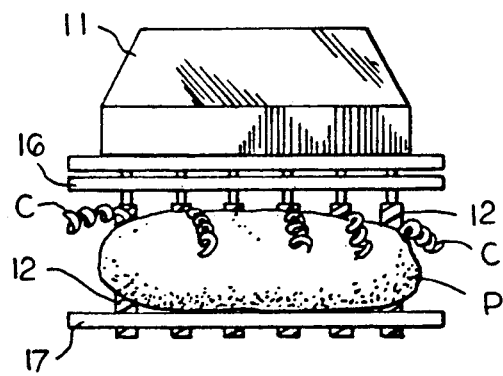
Figure 4D:
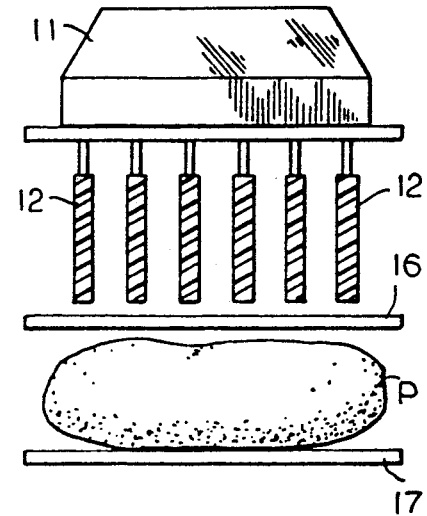

To prepare a potato P for cooking it is placed upon the lower support plate 17 beneath the upper plate 16, preferably with its skin peeled off. The spray nozzles 20 and 21 are activated and the drill motor energized thereby rotatably driving the gang of drills 12. The housing 11 is then lowered from the position shown in FIG. 4A to the position shown in FIG. 4B whereupon the drills pass through the channels 18 in the upper plate and into the potato. This action is continued until the housing has reached a position in close proximity with the upper plate 16, as shown in FIG. 4C, with the drills 12 having passed completely through the potato and also into the channels 19 of the lower plate 17. This drilling action causes potato twirls C to be formed and extracted out of the top of the holes formed in the potato, as also shown in FIG. 4C. The housing 11 is then returned to its original position as shown in FIG. 4D. As this occurs water sprayed from the nozzle 20 urges the potato twirls C to the left to a position beneath the vertical spray nozzle 21. The upper plate serves to guide the spray and to clear them from the drills. It also separates the whole potato from the drills which typically pull the potato off of the lower plate as the drills are lifted. Water spray from it then forces the twirls downwardly into a collection trough. The potato P, now formed with an array of holes as shown in FIG. 2, is then also removed. If desired, the multi-holed potato, now formed with a set of holes H, may be sliced into slices S, as shown in FIG. 3. In either event the twirls C, potato P or slices S are cooked.

The multi-holed potato, for which Applicant has coined the term "Swiss Potato", from a frozen state, is preferably deep fried in vegetable oil at 385° F. for 4½ minutes whole or for 3½ minutes sliced. Alternatively, it may be baked for 13 minutes at 425° F. or cooked in a microwave oven for 7 minutes at full power. The process is suited for use on various types of potatoes as well as on onions which herein are considered equivalents.

This method of preparing and cooking potatoes permits the cooking oil to enter and pass through the potato holes when deep fried resulting in the interior walls of the holes becoming uniformly brown. Where the potato is peeled prior to cooking, the uniformity also applies to the exterior. The holes also enhance heat transfer through the potato when cooked resulting in short and efficient cooking time.

The resulting product is a novel and unique finger food that is particularly well suited for sale and consumption at fast food outlets. The ratio of crust to core of traditional french fries is largely retained thereby providing excellent taste. Whether sliced or whole, potatoes prepared in this manner may be easily handled as finger foods.

It should be understood that the just described embodiment merely illustrates principles of the invention in a preferred form. Modifications, additions and deletions may be made thereto without departure from the spirit and scope of the invention as set forth in the following claims.

I claim:

1. A method of preparing a potato for eating which comprises the steps of simultaneously boring a set of holes in the potato to form a multi-holed potato, and cooking the multi-holed potato.

2. The method of claim 1 wherein the skin of the potato is peeled prior to cooking.

3. The method of claim 1 wherein the multi-holed potato is sliced prior to cooking.

4. The method of claim 1 wherein the multi-holed potato is cooked by deep frying.

5. The method of claim 1 wherein the multi-holed potato is cooked by baking.

6. The method of claim 1 wherein a set of potato twirls are formed and removed from the holes during boring, and wherein the twirls are also cooked.

7. The method of claim 1 wherein a set of potato twirls are formed and removed from the holes during boring.

* * * * *